US010015118B2

(12) United States Patent
Lee

(10) Patent No.: US 10,015,118 B2
(45) Date of Patent: Jul. 3, 2018

(54) MESSAGE HANDLING METHOD AND TERMINAL SUPPORTING THE SAME

(71) Applicant: Samsung Electronics Co., Ltd, Gyeonggi-do (KR)

(72) Inventor: Gahee Lee, Gangwon-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 14/011,600

(22) Filed: Aug. 27, 2013

(65) Prior Publication Data

US 2014/0059448 A1    Feb. 27, 2014

(30) Foreign Application Priority Data

Aug. 27, 2012  (KR) .......................... 10-2012-0093959

(51) Int. Cl.
*G06Q 10/00*     (2012.01)
*H04L 12/58*    (2006.01)
*H04L 29/06*    (2006.01)

(52) U.S. Cl.
CPC ............. *H04L 51/00* (2013.01); *G06Q 10/00* (2013.01); *H04L 51/066* (2013.01); *H04L 65/403* (2013.01)

(58) Field of Classification Search
CPC ............................ G06Q 10/107; H04L 12/581
USPC ........................................................ 715/752
See application file for complete search history.

(56) References Cited

U.S. PATENT DOCUMENTS

| 7,669,134 B1 | 2/2010 | Christie et al. |
| 2008/0307322 A1* | 12/2008 | Stochosky ............ G06F 3/0481 715/752 |
| 2009/0177981 A1 | 7/2009 | Christie et al. |
| 2009/0184939 A1 | 7/2009 | Wohlstadter et al. |
| 2009/0282332 A1* | 11/2009 | Porat ..................... G06F 3/0482 715/702 |
| 2010/0087169 A1 | 4/2010 | Lin et al. |
| 2010/0138502 A1 | 6/2010 | Miller et al. |
| 2011/0213846 A1 | 9/2011 | Sarin et al. |
| 2013/0069969 A1* | 3/2013 | Chang ..................... H04L 51/04 345/589 |

(Continued)

FOREIGN PATENT DOCUMENTS

| JP | 2004-102455 | 4/2004 |
| KR | 10-2012-0063407 | 6/2012 |

(Continued)

OTHER PUBLICATIONS

Extended European Search Report dated Dec. 11, 2013 in connection with European Patent Application No. 13181640.7, 7 pages.

(Continued)

*Primary Examiner* — Maryam M Ipakchi
*Assistant Examiner* — Pritisha N Parbadia

(57) ABSTRACT

Provided is a message handling function of a terminal and, particularly, a message handling method and a terminal for supporting the same, the message handling method including displaying plural messages, receiving a predetermined input event instructing aggregation of the plural messages, and aggregating at least one of the messages per user identification information to generate per-user aggregated messages according to the input event.

25 Claims, 12 Drawing Sheets

(56) References Cited

U.S. PATENT DOCUMENTS

2013/0091443 A1* 4/2013 Park ............... G06F 3/0485
                                                715/758
2013/0179800 A1* 7/2013 Jeong et al. ............ 715/752
2014/0297876 A1   10/2014 Aquilina et al.
2014/0300627 A1* 10/2014 Zuverink ......... G06F 3/0485
                                                345/617

FOREIGN PATENT DOCUMENTS

| KR | 10-2012-0089782 | 8/2012 |
| WO | WO 01/82044 A2 | 11/2001 |
| WO | 2011107656 A1 | 9/2011 |

OTHER PUBLICATIONS

International Search Report dated Nov. 4, 2013 in connection with International Patent Application No. PCT/KR2013/007648, 3 pages.
Communication from a foreign patent office in a counterpart foreign application, "The First Office Action," Chinese Patent Application No. CN201310376077.4, dated Sep. 5, 2017, 26 pages.

* cited by examiner

MESSAGE HANDLING METHOD AND TERMINAL SUPPORTING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Aug. 27, 2012 in the Korean Intellectual Property Office and assigned Serial No. 10-2012-0093959, the entire disclosure of which is hereby incorporated by reference.

TECHNICAL FIELD

The present disclosure relates to a message handling function of a terminal and, in particular, to a message handling method and terminal supporting the same for supporting the user to aggregate, disaggregate, transmit, and edit plural messages provided through the messaging service of the terminal according to the user's intention.

BACKGROUND

The electronic devices have been developed and distributed to make it possible for the users to carry out their jobs conveniently and have their convenient life. Recently, the wide spread use of the evolved electronic devices make people enjoy their lives. For example, the portable terminal makes it possible for the user to enjoy various contents anytime anywhere and organize data effectively, resulting in the improvement of time utilization efficiency.

Meanwhile, the mobile communication terminal makes it possible for the user to communicate with another user on the move. This means that the mobile terminal user can communicate and exchange information with the other terminal user. With the widespread use of the text messaging, users are exchanging various messages based on a messaging service. Particularly, the messenger service as a type of the messaging service supports to open a chat room having at least one member participant and to exchange various information through the chat room.

However, the conventional messaging service provides only a function that exchanged messages are displayed simply on a screen in real time, and services such as a service of providing messages changed according to the user's intention are not available. Therefore, there is a need for a technology for assisting the user to handle the messages more adaptively according to user's demand when using the message service.

SUMMARY

To address the above-discussed deficiencies of the prior art, it is a primary object of the present disclosure to provide a message handling method and terminal to allow the user to aggregate, disaggregate, transmit, and edit the messages easily and simply in a message environment in which at least one user has transmitted/received messages.

To achieve the above object, the present disclosure provides a configuration of a message handling method including displaying plural messages; receiving a predetermined input event instructing an aggregation of the plural messages; and aggregating at least some of the plural messages according to the input event by confirming one or more of the same user identification information and by aggregating the plural messages per the same user identification information to generate an aggregated message.

Also, the present disclosure provides a configuration of a terminal for processing messages, the terminal including an input device including one or more of an input unit configured to generate a predetermined input event to instruct aggregation of plural messages and a display unit having an input function; a control unit configured to aggregate at least some of the plural messages according to the input event to generate an aggregated message by aggregating them per at least one of the same user identification information; and a display unit configured to display the plural messages and the aggregated message.

Also, the present disclosure provides a configuration of a method for handling messages, the method including displaying plural messages; receiving a predetermined input event delimiting an aggregation range of the messages to be aggregated from the plural messages; and aggregating the messages in the aggregation range according to the input event.

Also, the present disclosure provides a configuration of a terminal for handing messages including a display unit configured to display a plurality of messages; an input unit configured to generate a predetermined input signal to delimit an aggregation range of the messages to be aggregated from the plurality of messages and the display unit having an input function; and a control unit configured to aggregate the messages in the aggregation range according to the input event to generate the aggregated message.

As described above, the message handling method and terminal allows the user to aggregate messages, transmit aggregated message, and disaggregate and edit the aggregated message efficiently according to the user's intention in the messaging service in which at least one user participates.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
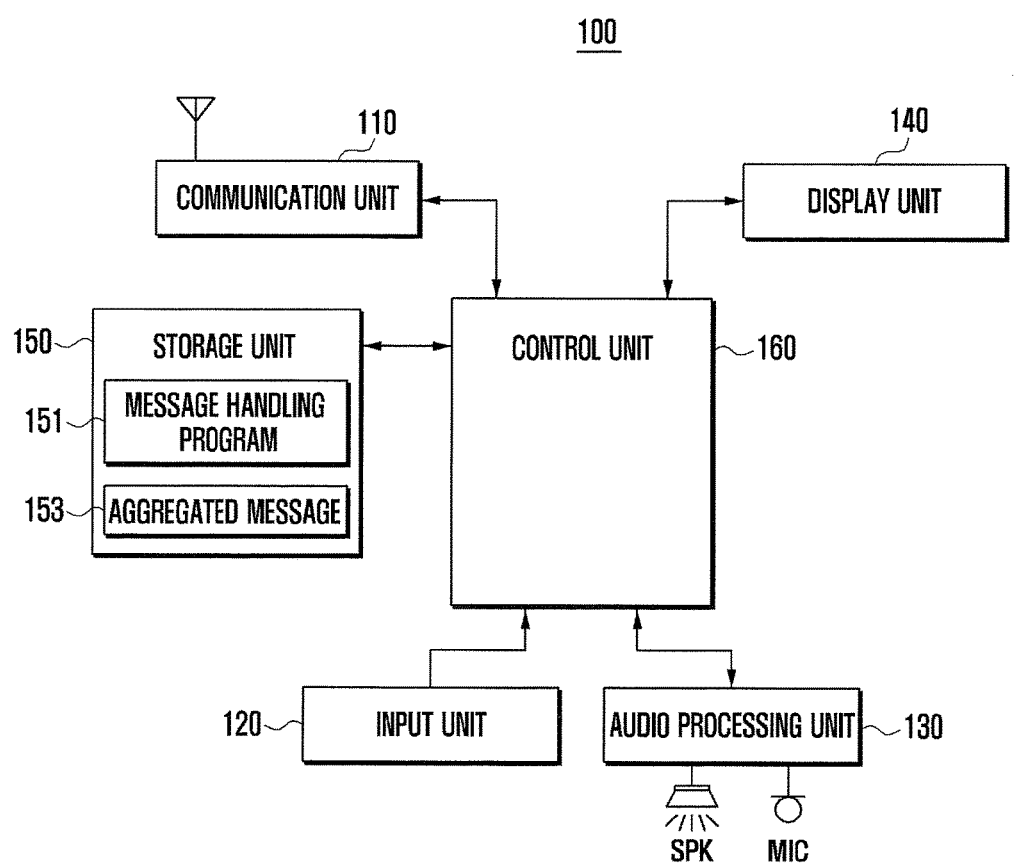
FIG. 1 is a schematic diagram illustrating a configuration of a terminal supporting a message handling according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure are described with reference to the accompanying drawings in detail. Detailed description of well-known functions and structures incorporated herein may be omitted to avoid obscuring the subject matter of the present disclosure. This aims to omit unnecessary description so as to make the subject matter of the present disclosure clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

FIG. 1 is a schematic diagram illustrating a configuration of a terminal supporting a message handling function according to embodiments of the present disclosure.

Referring to FIG. 1, the terminal according to embodiments of the present disclosure includes a communication unit 110, an input unit 120, an audio processing unit 130, a display unit 140, a storage unit 150, a control unit 160. One or more of the input unit 120 and the display unit 140 has an input function to operate as an input device.

The above-structured terminal 100 is configured to aggregate at least some desired messages of a specific user from the received/transmitted messages efficiently and conveniently. The terminal 100 is configured to transmit the aggregated messages to another terminal user to share the information. The terminal 100 is also configured to edit the contents of the aggregated message easily and, if necessary, disaggregate the aggregated message and maintain the original message window.

For this purpose, the communication unit 110 is configured to establish a communication channel with at least one other terminal for opening a chat room or forming a message group. Particularly, the communication unit 110 is configured to establish the P2P communication channel with other terminals to form a message group with the other terminals. The communication unit 110 is also configured to establish the communication channel with the other terminals for message communication in the form of a message group with the assistance of a server. The communication unit 110 is configured to include a communication module supporting a specific communication protocol for establishing the communication channel with at least one other terminal or a specific server. For example, the communication unit 110 can include a cellular communication module for supporting message communication based on various communication standards of $2^{nd}$ Generation (2G), 3G, 4G, 5G, and beyond. The communication unit 110 is not limited to a specific communication mode or communication module type but can be implemented in the form of establishing a communication channel configured to communicate with at least one other terminal. The message aggregation function of the present disclosure can be implemented with at least one of various functions including chat service function, text message function, email function, etc.

The input unit 120 generates various input signals that are necessary for operation of the terminal 100. The input unit 120 comprises various input devices including a keyboard, keypad, and key button depending on capability of the terminal 100. In the case that the display unit 140 is implemented with a touchscreen, the input unit 120 can be provided in the form of a touch map presented on the touchscreen. For example, the input unit 120 can be provided in the form of one or more of 3*4 key map, 5*4 key map, QWERTY key map, and Dvorak key map.

The input unit 120 is configured to generate an input signal for establishing a message group, an input signal for joining a certain message group, an input signal for composing any of various types of messages, an input signal for transmitting a message, etc. Particularly, according to embodiments of the present disclosure, the input unit 120 is configured to generate an input signal for aggregating at least some of the messages communicated in the message group, an input signal for requesting transmission of the aggregated message to at least one other designated terminal or at least one terminal, an input signal for disaggregating the aggregated message into basic messages, and an input signal for editing a part of the aggregated message.

The input signals for performing message aggregation, disaggregation, transmission, and edit function are implemented by a multi-touch method distinguished from a single touch method for supporting certain input signals configured to be used in the existing message group procedure and to perform a function more conveniently. The input signal generation for handling messages related to message aggregation, disaggregation, transmission, and editing is described in detail later with reference to accompanying drawings. The input signal is transferred to the control unit 160 as a command to be executed for performing the corresponding function.

The audio processing unit 130 processes the audio data configured in association with the operation of the terminal 100, the audio data acquired by playing audio file stored in the storage unit 150, and the audio data received from outside of the terminal 100 to generate an audible sound wave. The audio processing unit 130 is configured to support an audio data collection function. In order to accomplish this, the audio processing unit 130 can include a speaker (SPK) and a microphone (MIC).

Particularly, the audio processing unit 130 is configured to output various sound effects and guidance sounds generated in the message group handling procedure. For example, the audio processing unit 130 is configured to output the sound effects or guidance sounds notifying reception of the message input by other terminal users in the message group handing procedure and the sound effects or guidance sounds related to opening, ending, or exiting out of a message group. The audio processing unit 130 is also configured to output sound effects or guidance sounds for notification of successful message aggregation, and the sound effects or guidance sounds related to message disaggregation, transmission, and edit. Since the message handling functions are performed in accordance with the touch event based on the touch panel, the effect sound or guidance sound can be provided with occurrence of the touch event. The output of sound effects or guidance sounds can be changed according to user settings or by design.

The display unit 140 provides various screen interfaces in association with the operation of the terminal. For example, the display unit 140 displays a standby mode screen, a menu screen, etc. The display unit 140 can be implemented with a touch panel and a display panel. According to embodiments of the present disclosure, the display unit 140 is configured to provide various screen interfaces for supporting the message handling procedure.

Basically, the display unit 140 is configured to provide a message basic screen showing a state of reception/transmission of the message group and a message composition screen. The display unit 140 is configured to switch from the message basic screen to one of a message aggregation function screen, a message disaggregation function screen, an aggregated message transmission function screen, and an aggregated message edit function screen according to user manipulation.

The display unit 140 is configured to switch from the screen for supporting the respective functions, to reduce change in depth through additional page switching, and to handle a function related to the aggregated message process on the current screen. When handling a function related to the aggregated message, by manipulating through a message basic screen, the user is configured to handle a function related to various aggregated messages while viewing the message basic screen. The screen interfaces provided by the display unit 140 are described later in detail with reference to the accompanying drawings.

The storage unit 150 stores Operating System (OS) of the terminal 100 and application programs and data and algorithms associated with the functions of the terminal 100. Particularly, the storage unit 150 is configured to store the message handling program 151 for supporting the function related to the aggregated message of the present disclosure and aggregated message 153 generated by the message handling program.

The message handling program 151 supports a basic message function, e.g., 1:1 and 1:N message communication functions with other terminals. For this purpose, the message handling program 151 can include routines for establishing a message communication channel with another terminal based on the address information on the corresponding terminal, displaying a message basic screen showing the message exchange state along with establishment of the message communication channel, and updating the received/transmitted message in the message basic screen.

Particularly, the message handling program 151 can include routines for supporting the message aggregation function, supporting the aggregated message disaggregation function, supporting the aggregated message transmission function, and supporting the aggregated message edit function. The control unit 160 is configured to call the routines selectively to execute a function according to the corresponding routine. The operations of the routines will be described in detail with the description on the control unit 160.

The aggregated message 153 can be a message stored in the case that certain messages are aggregated in response to a message aggregation command input in the active state of the message function according to the activation of the message handling program 151. The aggregated message 153 can also be a message aggregated and transmitted by other users. The aggregated message 153 can include the message log information before aggregation as well as aggregated content. The aggregated message 153 can include one or more of message position on the screen before aggregation, message reception time, sender information, and message size. The aggregated message 153 can be disaggregated, transmitted, and edited based on these pieces of information.

The control unit 160 is configured to control power supply and data processing and transfer in association of the operation of the terminal 100. Particularly, in embodiments of the present disclosure, the control unit 160 can be configured as shown in FIG. 2 to perform the aggregated message-related function.

Figure 2:
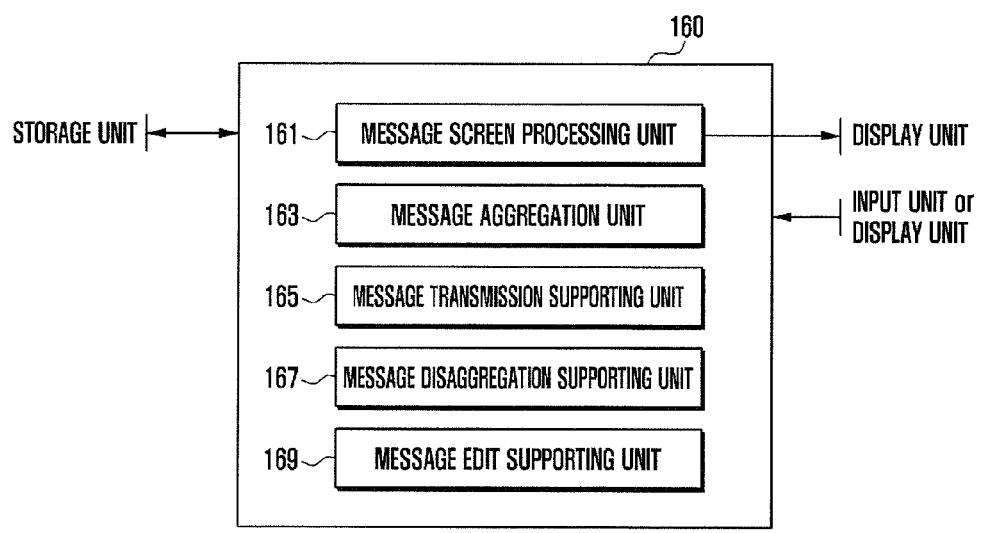
FIG. 2 is a diagram illustrating a configuration of a control unit of FIG. 1 in detail.

FIG. 2 is a diagram illustrating the configuration of the control unit 160 of the terminal 100 for supporting the aggregated message-related function according embodiments of the present disclosure in detail.

Referring to FIG. 2, the control unit 160 of the present disclosure includes a message screen processing unit 161, a message aggregation unit 163, a message transmission supporting unit 165, a message disaggregation supporting unit 167, and a message edit supporting unit 169. The configuration can be implemented by loading the routines on the control unit 160 in accordance with the activation of the message handling program 151 stored in the storage unit 150.

The message screen processing unit 161 processes the message handing-related screen. The message screen processing unit 161 controls the display unit 140 to display the message basic screen upon detection of a message handling activation request event. Here, the message basic screen can be the screen of displaying a message exchanged with at least one other user or a message transmitted to at least one other user.

If an input signal related to one of message aggregation, message disaggregation, aggregated message transmission, and aggregated message edit is detected on the input unit 120 or the display unit 140 having an input function in the state that the message basic screen is displayed, the message screen processing unit 161 supports to change the message basic screen by outputting a result according to the input signal on the message basic screen. The message screen processing unit 161 is configured to apply a visual effect on the screen in executing the input signal to perform the corresponding function. At this time, the message screen processing unit 161 is configured to present the aggregated message with a visual effect to distinguish it from other messages. The screen update operations of the message screen processing unit 161 are described later in detail with reference to accompanying drawings of certain screens.

The message aggregation unit 163 is responsible for aggregating plural messages according to the user's intention. The message aggregation unit 163 is configured to collect a predefined specific input signal, for example, a predetermined specific touch event such as double tap event and multi-touch event for indicating the start and last messages designating a range of the message of a specific user to be aggregated from the messages displayed on the message basic screen. If a specific touch event is collected instructing to aggregate messages in the corresponding range after the multi-touch event is collected, the message aggregation unit 163 aggregates the start and last messages and the messages between the start and last messages according to the aggregation command. At this time, the message aggregation unit 163 is configured to aggregate only the messages of a specific user from messages between the first message and last message designated by a specific touch event according to the user setting. The message aggregation unit 163 is configured to rule out the messages of other users except the specific user designated from the plural users between the start and last messages according to the setting, and creating the aggregated message by aggregating the messages of the user designated by the specific touch event. The aggregated message can be stored in the storage unit 150. Here, all the messages displayed or to be displayed in the message basic screen are the candidate messages that can be aggregated, and these messages include the messages input by the user as well as messages input by the other users belonging to the corresponding message group.

In the case that the users of the start and last messages designated with a specific touch event or by a preconfigured setting are different, the message aggregation unit 163 is configured to aggregate the messages between the first message and last message per user so as to create multiple aggregated messages. In the case that there are messages of the plural users between the designated first message and last message, the message aggregation unit 163 is configured to distinguish the corresponding messages to create the aggregated message. The message aggregation unit 163 is configured to arrange multiple aggregated messages on the message basic screen according to a predetermined rule. For example, the message aggregation unit 163 is configured to arrange the plural aggregated messages sequentially in an ascending order of the reception times of the first messages of the respective aggregated messages or in an alphabetical order of the names of the users who transmitted the messages.

However, the message aggregation unit 163 can output an error message when the messages transmitted by different users are selected by a multi-touch event according to the user setting or system designer's intention. Alternatively, in the case that a specific touch event is a multi-touch event, when a message transmitted by a specific user by the first touch event during the multi-touch event, the message aggregation unit 163 is configured to control such that the messages transmitted by other users are not selected.

The message aggregation unit 163 can support other types of input according to the predetermined configuration in addition to the above-described input methods. In more detail, the message aggregation unit 163 can support displaying a menu including various aggregation setting items for setting the message aggregation range. The aggregation setting items can include "an item for designating messages displayed on the current screen as the range", "an item for designating currently selected input messages as the range", and "an item for designating messages transmitted on the reception date of the selected message as the range" These aggregation setting items can be items configuring the range of the messages to be aggregated according to one or more of display format and temporal order. The user can predefine the range of the messages to be aggregated using the aggregation setting menu and create a specific input event to aggregate messages in the preset range.

The message transmission supporting unit 165 is configured to display a display window at an area of the display unit 140 for presenting the message input via a virtual input unit or the input unit for supporting the user's message input of the terminal 100, or display the message composed according to the signal input by a hardware key, at an area of the display unit 140. If a message transmission request for transmitting the composed message is detected, the message transmission supporting unit 165 transmits the message to the terminal of the at least one other user or other terminals via a server supporting a message group.

Particularly, when receiving an aggregated message transmission command, the message transmission supporting unit 165 transmits the message to the other terminal or a specific server. In the case that a message generated by aggregating basic messages is selected, the message transmission supporting unit 165 can display a menu window for transmitting the aggregated message to facilitate transmission of the aggregated message. Alternatively, the message transmission supporting unit 165 can transmit the aggregated message to the other terminal directly or the other terminal via the message service server by generation of a predetermined input signal such as generation of the input signal of double tap that selects the aggregated message displayed on the message basic screen twice or generation of input signal of touch-down of the corresponding message and swiping without displaying an extra menu window for transmitting the aggregated message. The message transmission supporting unit 165 is also configured to transfer the aggregated message to another application in the terminal as well as transmitting the aggregated message to another terminal. The message transmission supporting unit 165 is configured to transfer the aggregated message generated in an chatting service channel to a text message composition application program or email composition application program according to the user's control. Alternatively, the message transmission supporting unit 165 is configured to transfer the aggregated message to a memo application program or calendar or schedule application program.

In transmitting the aggregated message, the message transmission supporting unit 165 can include information by which the transmitted message can be recognized as the aggregated message for transmission. As described above, the aggregated message can include the information on the basic messages before aggregation in order to support editing the aggregated message based on these pieces of information.

The message disaggregation supporting unit 167 disaggregates the aggregated message. If an input signal for disaggregating the specific aggregated message, e.g., pinch-zoom event that is generated in the corresponding message of the display unit 140 on which the aggregated message is displayed, is collected, the message disaggregation supporting unit 167 disaggregates the aggregated message. At this time, the message disaggregation supporting unit 167 arranges the information included in the aggregated messages between other messages being displayed on the message basic screen based on time information of the messages constituting the aggregated message, for example. The message disaggregation supporting unit 167 can display a menu window for supporting the disaggregation function of the aggregated message, and the aggregation message is selected, for supporting display of the menu window, it can display the disaggregation function item as menu item. The menu item including a disaggregation function item is not included in the menu item displayed when non-aggregated message is selected.

The message edit supporting unit 169 edits the content of the aggregated message. The message edit supporting unit 169 can display an edit window to support editing the specific aggregated message or support the aggregated message editing in simple and efficient ways. In the case that plural users participate the message group, if the transmitted/received messages are updated in real time, the message edit function can be burdensome in the procedure utilizing a message confirmation function in the case that the size of the display unit 140 of the terminal is constrained. Accordingly, in the present disclosure, a fast and simple method is used for supporting the message edit function to execute message edit simply so as to handle aggregation and edit of the messages easily. For example, the message edit supporting unit 169 can support only a function deleting at least some message from the aggregated messages in response to generation of a specific input signal generated on the aggregated message. In order to accomplish this, the message edit supporting unit 169 is configured to delete from the aggregated message in a unit of basic messages before aggregation in the case that a delete command of the aggregated message is generated. This message deletion procedure is described in detail later with reference to accompanying certain screen images.

As described above, the terminal 100 according to embodiments of the present disclosure is configured to operate a function for aggregating messages according to the user's intention, a function for disaggregating the aggregated message into the basic messages, a function for transmitting the aggregated message, and a function for editing the aggregated message in the message environment where messages are exchanged with at least one user more conveniently while supporting the basic message function. Accordingly, the terminal according to embodiments of the present disclosure improves the user convenience by using various message handling functions. For example, the terminal 100 according to embodiments of the present disclosure is configured to forward a certain message to a certain user or storing the messages as aggregated per user when storing in the storage unit, resulting in facilitating message forwarding and storing. The terminal 100 according to embodiments of the present disclosure is configured to edit and transmit aggregated message on the message basic screen, resulting in more convenient message management.

Figure 3:
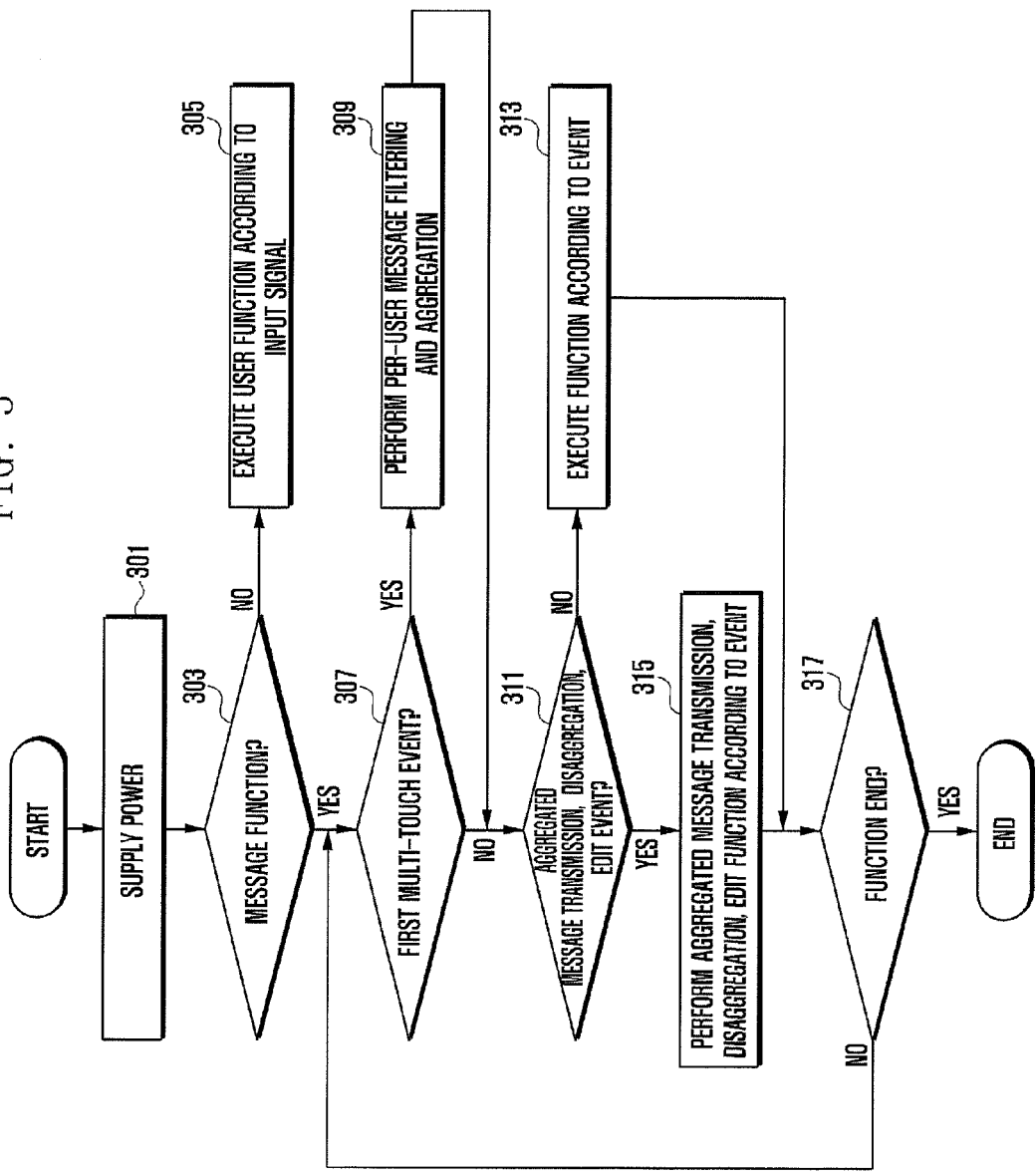
FIG. 3 is a flowchart illustrating a message handling method according to embodiments of the present disclosure.

FIG. 3 is a flowchart illustrating the message handling method according to embodiments of the present disclosure.

Referring to FIG. 3, in the message handling method according to embodiments of the present disclosure, the control unit 160 of the terminal 100 controls supply power from an electric source to the components of the terminal 100 at step 301. Afterward, the control unit 160 controls the display unit 140 to display the standby screen according to predetermined schedule information or activates a certain user function.

If an input signal is generated from the input unit 120 or the display unit 140 is configured to support an input function, the control unit 160 determines whether the input signal is an input signal for activation of a message function at step 303. If the input signal is not the input signal for supporting the message function, the control unit 160 executes the user function according to the input signal at step 305. For example, the control unit 160 can execute functions that can be supported by the terminal 100 such as a file search function, a file playback function, a file transfer function, a telephony function, a broadcast reception function, or a camera function according to the type of the input signal.

If the input signal is the input signal for the message function, the control unit 160 can control the display unit 140 to display the message basic screen for supporting the messaging function. If a certain input signal is generated, the control unit 160 determines whether the input signal is a predefined input signal, e.g., corresponding to a first multi-touch event at step 307. If the input signal corresponding to the first multi-touch event is generated, the control unit 160 performs per-user message filtering and aggregation function at step 309.

In more detail, the control unit 160 checks the messages in the range designated by the first multi-touch event, aggregates the start and last messages in the range designated by the first multi-touch event, and aggregates the messages except the messages of other users other than the user corresponding to the start and last messages. The control unit 160 is configured to aggregate only the messages of a specific user through user filtering. Alternatively, in the case that users of the messages designated by the first multi-touch event are different, the control unit 160 is configured to aggregate the messages of the users per user in a certain range designated by the first multi-touch event to generate the per-user aggregated messages as described above.

The control unit 160 is configured to check the users of the messages designated by the first multi-touch event according the intention of the designer and aggregating only the messages of the checked users. For example, if the first multi-touch event designates two other messages of the users as the start and last messages in a certain range, the control unit 160 is configured to aggregate only the messages of the users of the designated two messages and to filter and exclude the messages of other users in a certain range. The aggregated message generated according to the message aggregation can be stored in the storage unit 150 and displayed at an area of the message basic screen.

In the above description, the first multi-touch event is an input signal defined newly for executing a function related to message aggregation and aggregated message handling functions of the present disclosure and can be replaced by a certain touch event designated by the system designer for supporting the legacy message function such as single tap event, single long press event, single drag event, etc. For example, if the first multi touch event is changed to the single tap event, the user can generate a single tap event for indicating the first message of the messages to be aggregated, another single tap event for indicating the last message of the messages to be aggregated and additionally, a certain touch event for instructing message aggregation. In the case of the single long press event and the signal drag event, the user can generate the long press event to indicate a certain message and then a movement touch event, e.g., a drag event to indicate the range of the messages to be aggregated. Then the control unit 160 is configured to aggregate the first message indicated by the long press event and other messages indicated by the drag event so as to aggregate the messages of only a specific user or aggregate the messages per user.

The first multi-touch event can be replaced by another input event according to the predefined range configuration. In the case that the current on-screen messages are configured as the aggregation range of the messages, the first multi-touch event can be replaced by a certain input event for selecting a certain message and aggregating the selected message and other messages associated with the selected message. For example, the user can make a double tap touching a certain message twice continuously or long press touching for a certain time to aggregate at least some of the current on-screen messages. At this time, the control unit 160 is configured to aggregate other messages having the same user identity information as the message selected by the input event from the on-screen messages. Here, the user identity information can include one or more of user ID, phone number, and IP address, which are used for the message transmission/reception, for example. Meanwhile, the control unit 160 is configured to designate the range of the messages to be aggregated to the entire messages having the same user ID as the message selected at a specific date or the messages having the same user ID received from the date of the selected message to the present time according to a predetermined range configuration.

If the input signal generated at step 307 does not correspond to the first multi-touch event that is predefined for message aggregation, the control unit 160 determines whether the input signal corresponds to an event for transmitting, disaggregating, or editing aggregated message at step 311. If the input signal is not an input signal for the function related to the aggregated message, the control unit 160 executes the function according to the corresponding event at step 313. For example, the terminal 100 is configured to execute message composition and transmission functions according to the input signal or downloading a file uploaded by another terminal user.

If the input signal for the function related to the aggregated message is generated at step 311, the control unit 160 performs the function relate to the aggregated message according to the corresponding input signal at step 315. In more detail, the control unit 160 is configured to check the time information on the aggregated message and time information on the messages displayed on the message basic screen according to the input signal and rearrange the basic messages included in the aggregated messages according to a position between time information. The control unit 160 is also configured to transmit the aggregated message to at least one user among the users belonging to the message group or a specific user designated by the terminal user according to the input signal. The control unit 160 is also configured to delete at least some part of the aggregated message according to the input signal.

Next, the control unit 160 determines whether an input signal for terminating the function is generated at step 317 and, if no termination signal is input, returns the procedure to step 307 for executing the subsequent procedure. Alternatively, if the input signal for terminating the function is generated, the control unit 160 terminates the corresponding function. Additionally, the terminal 160 returns the procedure to step 301 to execute the subsequent procedure before the input signal for terminating the terminal 100 is generated.

Hereinabove, the terminal 100 performs the function related to the message aggregation and the aggregated message according to embodiments of the present disclosure and a method for operating a terminal have been described. An example of screens the terminal 100 can provide in the procedure for performing the function related to the message aggregation and aggregated message is described below.

Figure 4:
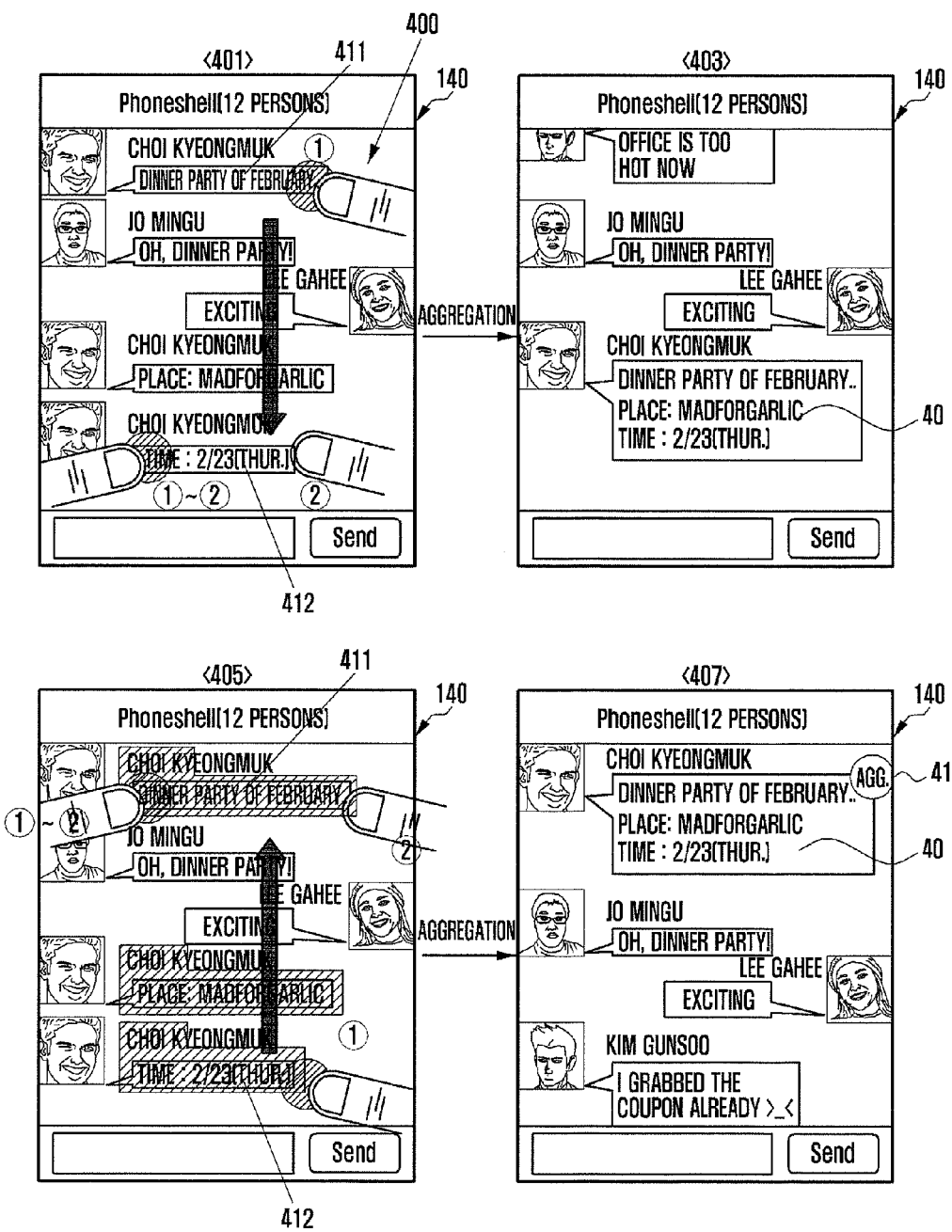
FIG. 4 is a diagram illustrating certain screens for explaining a message aggregation function according to embodiments of the present disclosure.

FIG. 4 is a diagram illustrating the message aggregation function according to embodiments of the present disclosure.

Referring to FIG. 4, if an input signal for activating the message function is generated via the input unit 120 or the display unit 140 supporting the input function or if a message function activation request from another user is accepted, the control unit 160 of the terminal 100 controls the display unit 140 to display the message basic screen 400 as shown in the screen 401. The message basic screen 400 can show the messages transmitted by plural users at the message group including plural users as shown in the drawing. The message basic screen 400 can show the message input by the user of the terminal 100 at the right side of the screen to distinguish transmitted message from received message.

The user can generate an input signal for aggregating a specific message on the message basic screen 400. For example, the user is can perform a first multi-touch event for selecting the messages 411 and 412 on the screen of the display unit 140 having the input function. The user also can perform an event for aggregating messages in the range delimited by the messages 411 and 412, e.g., by touching down the message 411 and dragging the message 411 to the message 412. If the message 411 is dragged close to the message 412, the control unit 160 aggregates the messages in the range delimited by the messages 411 and 412 to generate an aggregated message 40 and controls the display unit 140 to display the aggregated message 40. If a flick event or swipe event is performed in the direction to the message 412 on the selected message 411 in the state that the touching event selecting the message 412 is maintained, the control unit 160 can judge the corresponding signal as the input signal for aggregating messages. If an event for releasing selection of the messages 411 and 412 are detected, the control unit 160 can judge the input signal as the message aggregation signal for aggregating the messages.

The control unit 160 can rule out the other users' messages, e.g., message 413, in the message aggregation procedure and aggregate the messages 411 and 412 and other messages transmitted by the user of the messages 411 and 412 to generate the aggregated message 40. The control unit 160 can control such that the aggregated message 40 is displayed at a predetermined area, e.g., the position where the message 412 is displayed.

If the messages 411 and 412 are selected by the first multi-touch event, the control unit 160 is configured to control such that the aggregated messages are highlighted or displayed with a certain visual effect as shown in the screen 405 in order for the user to check the messages to be aggregated easily. The control unit 160 is also configured to control such that the messages of the other users are displayed as relatively dimmed or darkened as compared to the messages of the user. The control unit 160 is also configured to control such that the aggregated message 40 is marked with a mark 41 or a predetermined visual effect as shown in the screen 407 for emphasizing the aggregated message.

The screens 405 and 407 are of message aggregation function substantially similar to that of the screens 401 and 403. However, the screens 405 and 407 show the case where the first multi-touch event for selecting the messages 411 and 412 is followed by a touch event for selecting the message 412 to change the position of the aggregated message 40. The user can perform a touch event for selecting the message 412 and dragging, flicking, or swiping the message 412 in the direction to the message 411. Then the control unit 160 aggregates the messages in the range delimited by the messages 411 and 412 to generate the aggregated message 40 at the position where the message 411 has been arranged.

Figure 5:
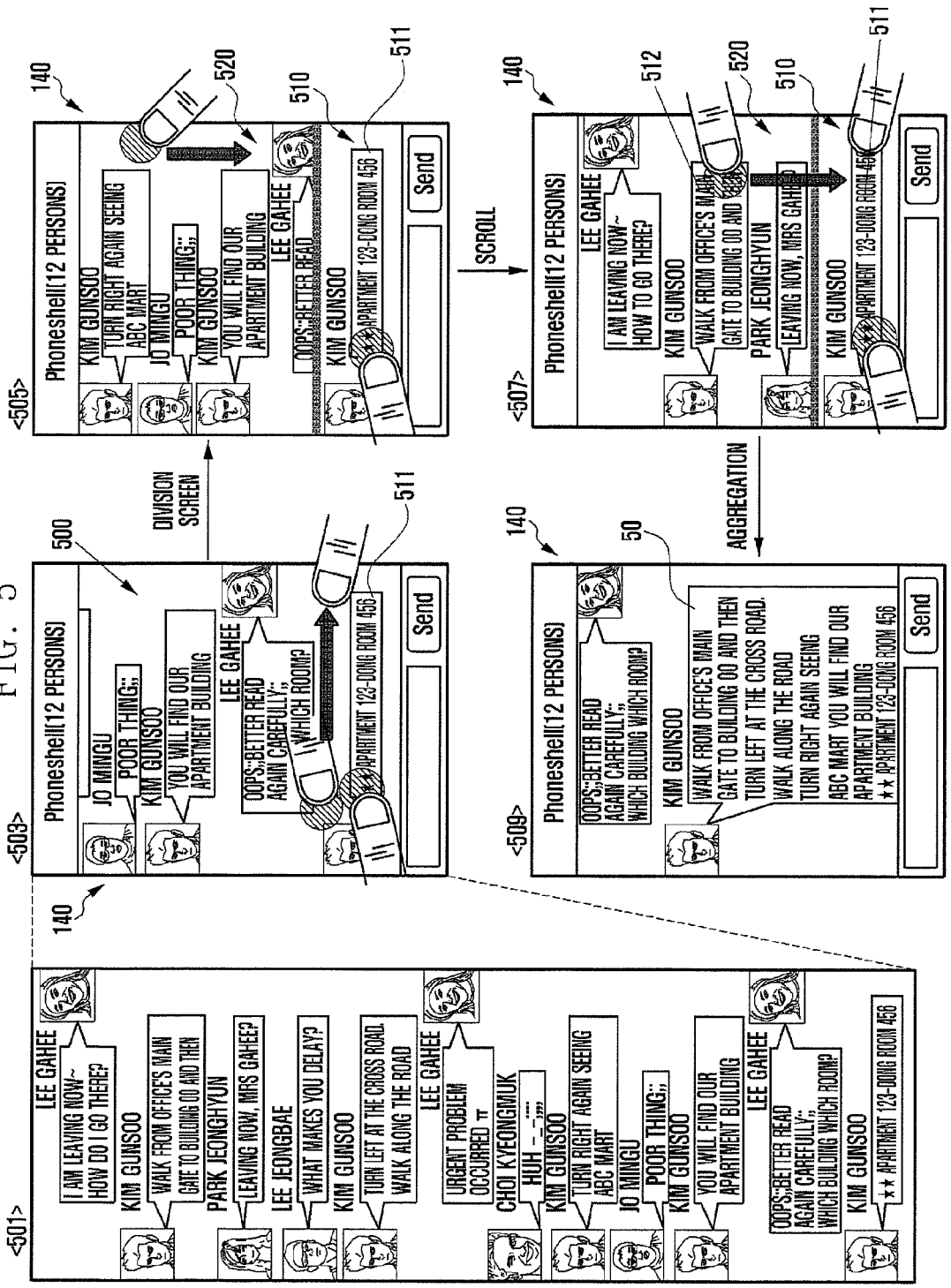
FIG. 5 is a diagram illustrating certain screens for explaining a message aggregation function according to embodiments of the present disclosure.
Figure 6:
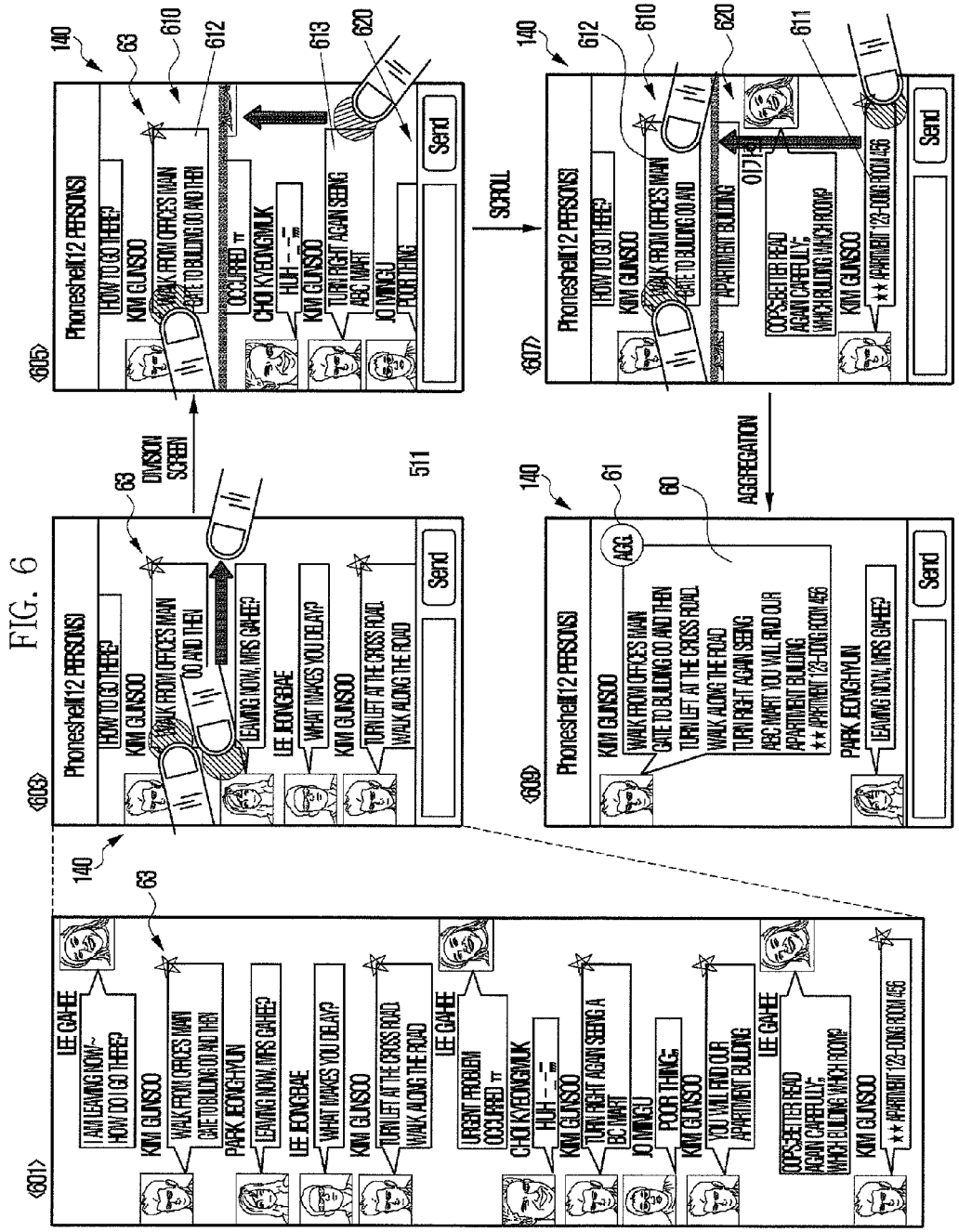
FIG. 6 is a diagram illustrating certain screens for explaining a message aggregation function according to embodiments of the present disclosure.

FIGS. 5 and 6 are diagrams illustrating message aggregation functions according to embodiments of the present disclosure.

Referring to FIG. 5, the terminal 100 can display at least some of the transmitted/received messages on the screen of the display unit 140. Although there are large amount of transmitted/received messages as shown in screen 501, the control unit 160 controls such that only some of the plurality of messages are displayed on the message basic screen 510 due to the size-constrained display unit 140 as shown in screen 503.

However, the user can to generate an aggregated message including the messages not shown on the message basic screen 510 in the procedure performing a message function through the message basic screen 510. In this case, the user can generate an input signal, e.g., a second multi-touch event, for aggregating the hidden messages as well as the on-screen message of the message basic screen 510, as shown in the screen 503. For example, the second multi-touch event can be a touch event of making a double tap on the message basic screen 510 as shown in the drawing and then a drag corresponding to movement touch event. At this time, the movement touch event can be generated with the drag gesture of splitting the message basic screen 510 horizontally. The second multi-touch event of the present disclosure is not limited to the above described touch events but can be modified or replaced by various touch events depending on changes in the design type of the designer or user's configuration.

The control unit 160 is configured to change the screen for message aggregation in response to the second multi-touch event as shown in the screen 505. In more detail, the control unit 160 can provide a first division screen 510 for distinguishing a certain area including the touch event for selecting the message 511 during the second multi-touch event and a second division screen 520 for searching for another message to be aggregated from the plurality of messages.

Then the user can generate a scroll event on the second division screen 520 of the screen to search the plurality of messages. The control unit 160 can control such that other messages of the plurality of messages appear on the second division screen 520 according to the scroll event generated on the second division screen 520. At this time, the touch event made for selecting the message 511 can be maintained in the touch state. If the user wants to cancel the message aggregation function, the user can make a gesture of releasing the message 511 selection event and thus, if the message 511 selection event is released without an extra message selection event on the second division screen 520 of the screen, the control unit 160 identifies the release as a cancellation of the message aggregation function and controls to return the procedure to the state of the screen 503.

Among the plurality of messages shown in the screen 501, the hidden messages not shown on the message basic screen 500 can be shown on the second division screen 520 according to the scroll event. In the process, the user can select the message 512 and generate an input signal for aggregating the message as shown in the screen 507. For example, the user can select the message 512 and generate a movement touch event in a certain direction, e.g., a drag event, a flick event, or a swipe event. Particularly, the user can make the touch event for the message 512 selection generated on the second division screen 520 continue to the first division screen 510. If a touch event crossing the second division screen 520 and the first division screen 510 is generated, the control unit 160 controls such that the messages in the range delimited by the messages 511 and 512 are aggregated into the aggregated message. The control unit 160 can control the display unit 140 to display the aggregated message 50 as shown in the screen 509. As the aggregated message 50 is generated and displayed, the control unit 160 controls such that the divided screens are recovered into the integrated screen.

Meanwhile, the control unit 160 can provide various visual effects in the above described aggregated message generation procedure as described with reference to FIG. 6. The message aggregation function of FIG. 6 is similar to that of FIG. 5. However, the message aggregation function of FIG. 6 shows, as an example, the first division screen 610 is arranged at the upper part of the screen of the display unit 140. For this purpose, the user can generate a touch event similar to the second multi-touch event at the upper part of the screen of the display unit 140 as described above. Then the control unit 160 arranges the first division screen 610 at the upper part of the screen of the display unit 140 and the second division screen 620 for searching the entire messages below the first division screen 610.

As shown in FIG. 6, in the procedure supporting the message aggregation function, when a message to be aggregated is selected, the control unit 160 can highlight the message or provide a visual effect 63 to the message as shown in the screen 603. The messages transmitted by a specific user can be presented with the specific visual effect 63. Substantially, such a visual effect 63 can be given to all the messages transmitted by a specific user as shown in the screen 601 as well as the messages of the specific user as shown in the screen 603. The above described visual effect 63 can also applied to the divided screen. In the state that the screen is divided into the first and second division screens 610 and 620 as shown in the screens 605 and 607, the visual effect 630 can be applied to the message 612 displayed on the first division screen 610 and the messages 613 and 611 transmitted by the same user as that of the message 612 in the procedure of scrolling the messages across the second division screen 620 in response to the scroll event.

If an input signal for aggregating the message 612 displayed on the first division screen 610 and the message 611 displayed on the second division screen 620 is generated in the state of screen 607, the control unit 160 controls the display unit 140 to display the aggregated message 60 as shown in the screen 609. At this time, the control unit 160 can present the message with a mark 61 at a side in order to indicate that the corresponding message is the aggregated message. The control unit 160 is also configured to control such that the aggregated message 60 is presented with different color or shape to indicate the aggregated message 60 without extra mark 61. The control unit 160 is configured to display the messages to be aggregated in distinctive color and/or shape so as to be distinguished from other messages and displaying the aggregated message 60 in distinctive color and/or shape so as to be distinguished from other messages.

Figure 7:
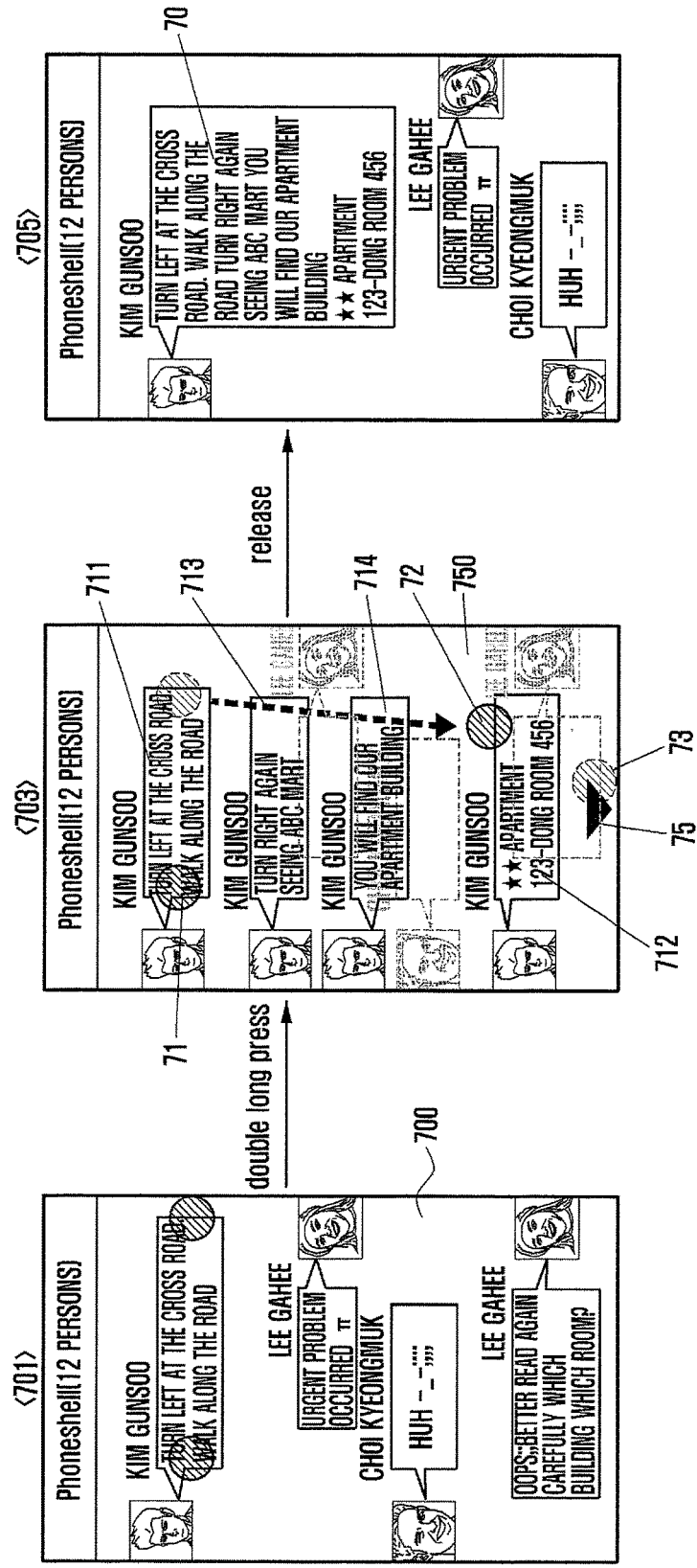
FIG. 7 is a diagram illustrating certain screens for explaining a message aggregation function according embodiments of the present disclosure.

FIG. 7 is a diagram illustrating the message aggregation function according to embodiments of the present disclosure.

Referring to FIG. 7, the display unit 140 can display the message basic screen 700 including the messages transmitted/received by at least one user as shown in the screen 701. In this state, the user can generate a third multi-touch event predefined for message aggregation. For example, if the user touches the message 711 transmitted by a specific user twice and generates a double long press touch event while maintaining the double touch, the control unit 160 controls the display unit 140 to display a message collection screen 750 showing only the messages transmitted by the same user who has transmitted the selected message 711 as shown in the screen 703. At this time, the control unit 160 can overlay the message collection screen 750 on the message basic screen 700 without an extra screen switching operation and in this procedure, the control unit 160 can control such that the message collection screen 750 is displayed semi-transparently and the message basic screen 700 is shown through the message collection screen 750.

Meanwhile, the user can modify one of the first touch event 71 maintained for selecting the message 711 and the second touch event 72 to a drag event to indicate a specific message to be aggregated, e.g., message 712. The second touch event 72 can be the touch event corresponding to touch drag gesture indicating the message 712 is to include the messages 713 and 714. If the user performs touch release gesture after the touch drag gesture, the control unit 160 aggregates the messages in the range delimited by the messages 711 and 712 selected with the first and second touch events 71 and 72, i.e. the messages 711, 712, 713, and 714. Afterward, the control unit 160 displays the aggregated message 70 at a predetermined position as shown in the screen 705. If the third touch event 73 is generated on the virtual control key 75 for scrolling, which is positioned below the message 712 by the touch gesture, the control unit 160 scrolls the screen at a predetermined speed to show other messages transmitted by a specific user on the screen of the display unit 140. The third touch event 73 can be the touch event in which the position of the initial second touch event 72 is changed by the drag event. The control unit 160 is configured to scroll the screen according to the scroll event such that the message 711 disappears from the screen of the display unit 140, or maintaining the message 711 at a specific position on the screen, e.g., position where the first touch event 71 is maintained, although the messages 713 and 714 disappear on the screen of the display unit 140.

Figure 8:
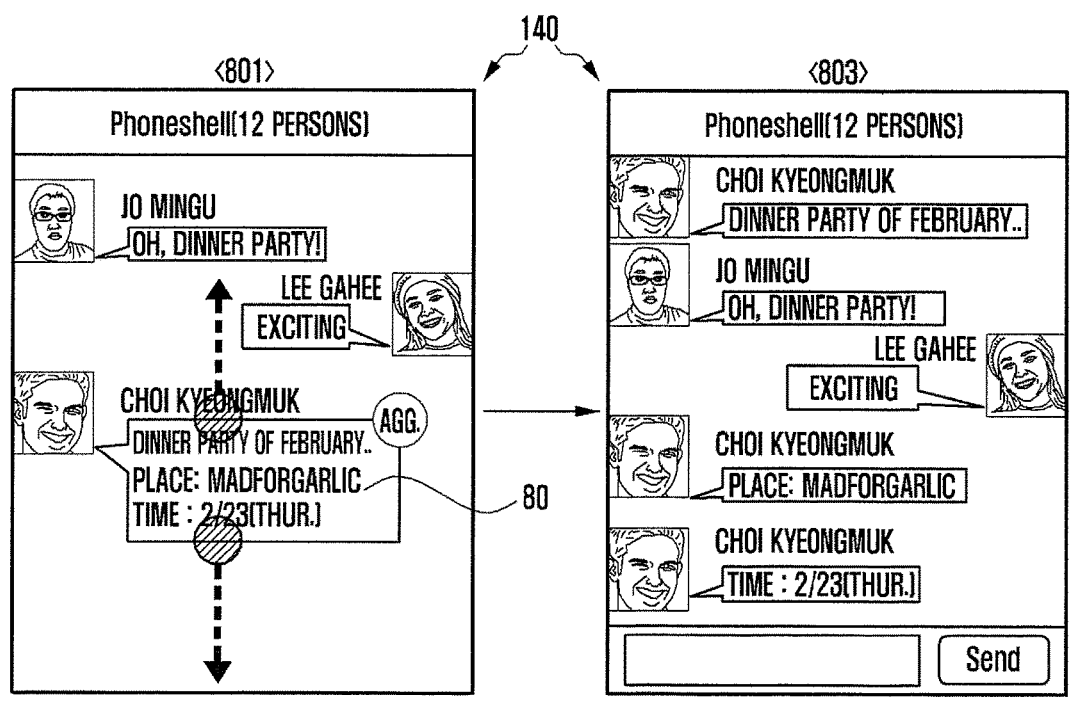
FIG. 8 is a diagram illustrating certain screens for explaining a message disaggregation function according to embodiments of the present disclosure.

FIG. 8 is a diagram illustrating the message disaggregation function of the message handling function according to embodiments of the present disclosure.

Referring to FIG. 8, the terminal 100 displays the aggregated message 80 on the screen of the display unit 140 as shown in the screen 801. In this state, the user can generate a fourth multi-touch event to disaggregate the aggregated message 80 according to the user's intention. For example, the user can perform a pinch-out event in such a way of making a multi-touch with two contact points of two ends of the aggregated message 80 and dragging the two contact points in the opposite direction or facing direction. Alternatively, the user can also generate a touch event in such a way of making a multi-touch with two contact points of the aggregated message 80 and dragging the two contact points in a specific direction, e.g., in the same direction.

If the fourth multi-touch event is generated to the aggregated message 80, the control unit 160 disaggregates the aggregated message 80 to arrange it in a certain position as shown in the screen 803. For this purpose, the control unit 160 checks the information on the basic messages constituting the aggregated message 80 from the information stored in the storage unit 150, particularly, the time information on the basic messages. The control unit 160 checks the time information on the messages of other users included in the time information of the start and last messages constituting the aggregated message 80. Afterward, the control unit 160 arranges the messages according to a time based on the time information of the basic messages included in the aggregated message 80 and the time information of the messages transmitted by the other user. The messages shown in the screen 803 are arranged based the time information.

Figure 9:
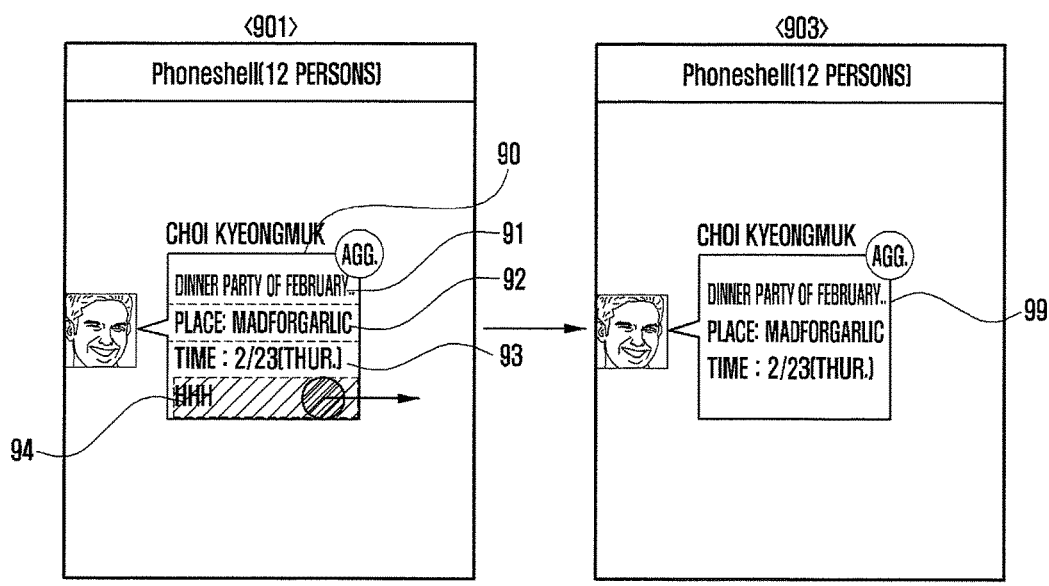
FIG. 9 is a diagram illustrating certain screens for explaining a message edit function according to embodiments of the present disclosure.

FIG. 9 is a diagram illustrating the message edit function of the message handling function according to embodiments of the present disclosure.

Referring to FIG. 9, the control unit 160 can display the aggregated message 90 on the screen of the display unit 140 as shown in the screen 901. The aggregated message 90 can be the aggregated message of one of messages composed by the terminal user or messages transmitted by another user. Particularly in screen 901, the aggregated message 90 is composed of four basic messages. The aggregated message 90 is composed of the first basic message 91, the second basic message 92, the third basic message 93, and the fourth basic message 94.

Although the user generated the aggregated message 90 by aggregating the messages of a specific user in the message aggregation procedure, the user can remove a part of the message from the aggregated message. In this case, the user can perform a touch event selecting the basic message to be removed and swiping or flicking event in a certain direction. For example, the user can select the fourth basic message 94 and flick in a certain direction. If a predetermined event, e.g., a swipe event, is generated on the fourth basic message 94, the control unit 160 removes the fourth basic message 94 from the aggregated message 90. Accordingly, the control unit 160 controls the display unit 140 to display the aggregated message 99 from which the fourth basic message 94 has been removed as shown in the screen 903.

The above described message edit function can be useful in aggregating only necessary information in the message service environment supporting messages including optional images of emoticons, virtual stickers, and image corresponding to particular word or character. The optional images occupy relatively large space as compared to the text image include less content to be transferred and can therefore distort the content of the message. The terminal 100 according to embodiments of the present disclosure is configured to remove the basic message from the aggregated message through a simplified edit manipulation such that the user generates the aggregated message as edited according to the user's intention. According to embodiments of the present disclosure, it is possible to remove unnecessary letters or spaces from the aggregated message as default.

Figure 10:
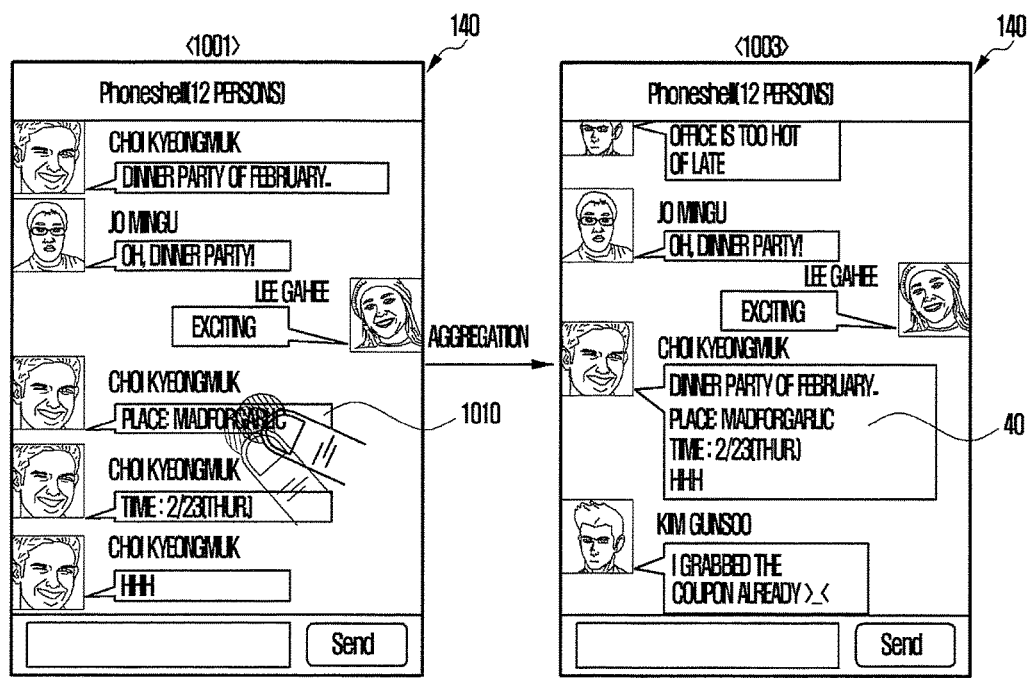
FIG. 10 is a diagram illustrating certain screens for explaining other examples of the message aggregation function according to embodiments of the present disclosure.

FIG. 10 is a diagram illustrating the message aggregation according to a preconfigured range during the aggregated message generation function according to embodiments of the present disclosure.

Referring to FIG. 10, in the state that the user has configured the message aggregation range as on-screen messages for an aggregated message generation function, the terminal 100 aggregates the messages presented on the current screen in response to a predetermined input event. Screen 1001 is displayed in the case that the aggregation range is configured as the on-screen message. The terminal 100 is configured to display the menu for configuring the message aggregation range and can allocate an item which can change an aggregation range configuration item to certain hot keys, side keys, or volume keys. If a message aggregation range configuration request of the user is generated, the terminal 100 can display a screen for aggregation range configuration or activate hot keys related to the aggregation range configuration.

The user can then use the aggregation range configured to the terminal 100 as the default or configure a specific aggregation range directly. For example, the user can configure the aggregation range as all of the messages displayed on the screen at the time when a message is selected. Alternatively, the user can configure the aggregation range as messages transmitted/received from the reception time of the selected message to the time when the aggregation is performed, messages transmitted on the reception date of the selected message, or a predetermined number of messages transmitted before or after the selected message. The terminal 100 of the present disclosure supports one or more of configuring the aggregation range as messages displayed on the current screen in a procedure for configuring the aggregation range, configuring the aggregation range as recently received messages from a specific message selected from the plural messages, configuring the aggregation range as messages transmitted on a specific date, and configuring the aggregation range as a predetermined number of messages arranged before or after the message selected from the plural messages.

After the aggregation range is configured as the on-screen messages, the user can generate a predetermined specific input event, e.g., an input event for a double touch to a specific message 1010 to be aggregated. Then the terminal 100 aggregates messages having the same user ID as the messages selected by the input event from all the messages displayed on the current screen, and displays the aggregated message 40 as shown in the screen 1003. For this purpose, the terminal 100 collects the information on the on-screen messages, checks the user ID of the specific message selected by the input event, and aggregates the message having the same user ID from the on-screen messages automatically.

The above described double touch, a touch with two contact points, can be changed to the gesture of touching down the area on which the message is displayed and dragging the contact points as much as a predetermined distance, and the suggested touch gesture is distinguished from the touches used until now. The control unit 160 can match an aggregation configuration item to a specific touch gesture. The terminal 100 aggregates the plural messages when a specific gesture is performed by the user. This function is advantageous in making it possible to select an aggregation method in adaptation to the situation.

In the case that there is an empty space with no text or image on an area of the display unit as a consequence of the message aggregation, the terminal 100 can control to fill the space with other messages. For example, the terminal 100 can operate such that the hidden messages appear on the screen as the consequence of the aggregation of the messages as shown in the drawing. Particularly, the terminal 100 is configured to display the messages received before and after the aggregated messages 40 on the screen of the display unit 140. In the case that the aggregated message includes a recent message, the terminal 100 operates such that the previously received messages in the empty space of the screen according to the message aggregation appear on the display unit 140.

Figure 11:
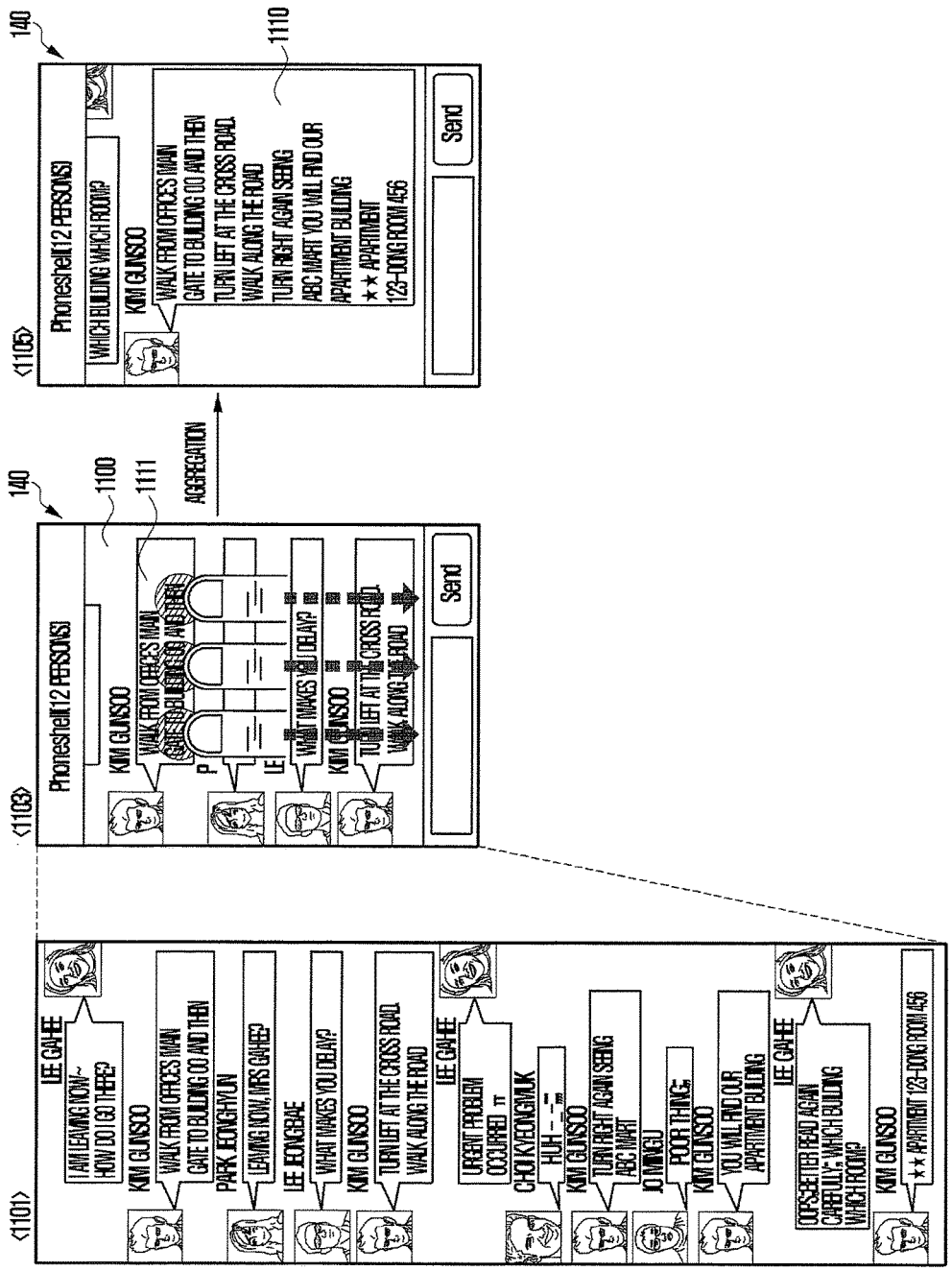
FIG. 11 is a diagram illustrating another examples of the message aggregation function according to embodiments of the present disclosure.

FIG. 11 is a diagram illustrating an example of the message aggregation according to the predetermined configuration of a range of the aggregated message generation function according to embodiments of the present disclosure.

Referring to FIG. 11, if an input signal for activating the message function is generated via the input unit 120 or the display unit 140 supporting the input function or if the message function activation request from other user is accepted, the control unit 160 of the terminal 100 can control the display unit 140 to display the message basic screen 1100 as shown in the screen 1103. As shown in the drawing, the message basic screen 1100 can show the messages transmitted by plural users of the message group including the plural users. The message basic screen 1100 shows the message input by the user of the terminal 100 at the right side of the screen so as to distinguish the received messages from the transmitted messages. Here, the screen 1103 displays some of the plural messages of screen 1101.

Here, it is assumed that the aggregation range is configured as default in the terminal 100. In this case, the user activates an aggregation range configuration item to select an aggregation range item or enter the aggregation range. FIG. 11 shows the case where the aggregation range is configured from the message selected by the user to the recently received message. The terminal 100 can provide the items for configuring the aggregation range and support to apply the corresponding function according to the user's selection.

The terminal 100 can control the display unit 140 to display only some of all the received messages as shown in the screen 1103, and the user can navigate and check the hidden received messages except the recently received messages by message scrolling of the user. Afterward, if a message to be designated as the start of aggregation is found by the user during the message search, the user can make a specific touch gesture for selecting the first message 1111, e.g., a gesture for generating a multi-touch event having three contact points on the first message 1111 as shown in the screen 1103. Afterward, the user can drag the three contact point multi-touch downwards as shown in the drawing according to a predefined gesture for the aggregated message generation.

If the multi-touch event with three contact points for selecting the first message 1111 is followed by a downward drag event, the terminal 100 aggregates the messages in the range delimited by the first message 1111 and the most recently received message. In the procedure, the terminal 100 can filter only the messages having the same user ID as the first message from the messages between the first message and the most recently received message and aggregate them to generate the aggregated message. The aggregated message 1110 is displayed on the display unit 140 as shown in the screen 1105.

Meanwhile, in the case that the user generates the multi-touch event with three contact points to the first message 1111, the terminal 100 can display a guidance message for guiding the user to make the drag gesture in a predetermined direction for generating the aggregated message on the screen of the display unit 140. The user can make the event as guided to aggregate the messages.

Figure 12:
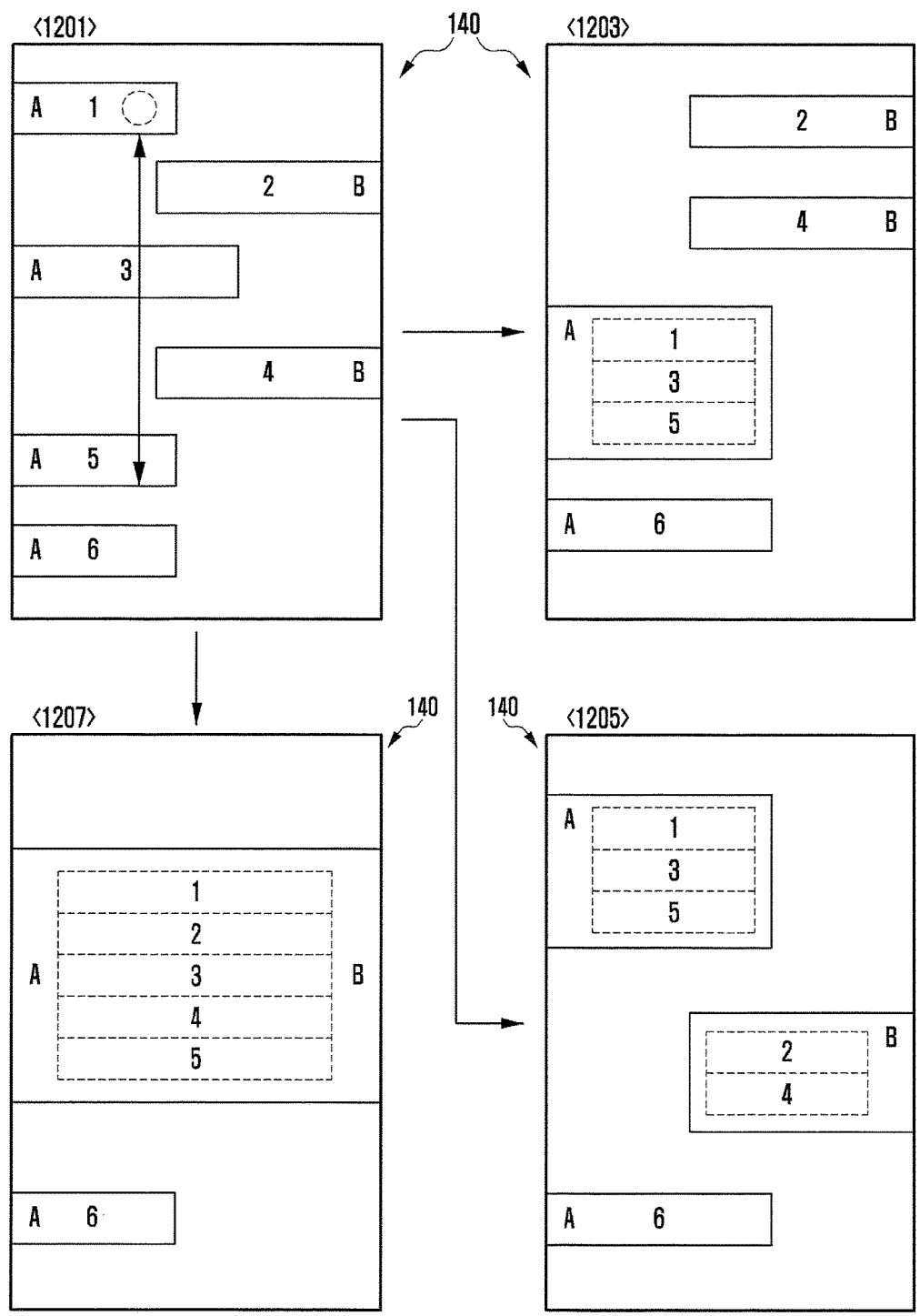
FIG. 12 is a diagram illustrating various forms of the message aggregation function according to embodiments of the present disclosure.

FIG. 12 is a diagram illustrating message aggregation in the 1:1 environment of the message aggregation environment according to embodiments of the present disclosure.

Referring to FIG. 12, the terminal user can exchange text messages or chatting messages with another user, and the messages exchanged by the respective users are displayed to distinguish a reception side from a transmission side as shown in the screen 1201. Although the message screen is shown as having the 1:1 environment of the receiver side and the sender side, the present disclosure is not limited thereto. For example, the present disclosure can be applied to the function of inputting only the messages of the sender uni-directionally to write information in the cloud service during the message transmission function. In this case, there can be no messages of the user "B" or user "A" as shown in the screen 1201.

The user can make a gesture for generating a predetermined touch event for aggregating the transmission message or transmitted/received messages presented in a predetermined range. The terminal 100 aggregates the messages in response to the corresponding touch event. Here, the terminal 100 can aggregate only the messages of the side "A" to generate the aggregated message as shown in the screen 1203 or aggregate the messages of the side "A" and the messages of the side "B" separately to generate the respective aggregated messages as shown in the screen 1205. The terminal 100 can aggregate the messages of both the sides "A" and "B" to generate a single aggregated message as shown in the screen 1207.

As described above, a message handling method and the terminal supporting the same and the screen interface for supporting the same according to embodiments of the present disclosure is configured to facilitate message aggregation, disaggregation, transmission, and edit functions. The present disclosure supports to facilitate a user's terminal manipulation for message aggregation and its related functions in the environment where a large amount of messages are exchanged.

Although the description is directed to the screen interface for message aggregation, disaggregation, and edit functions, the present disclosure is not limited thereto. For example, the terminal 100 can display an option window including a transmission menu item when the aggregated message is selected for transmission and, if the transmission menu item is selected, the terminal sends the aggregated message to other users, or specific users selected by the terminal user.

The terminal 100 can further include various additional modules depending on its implementation. For example, in the case that the terminal 100 is a communication terminal, the terminal 100 can include various components that are not described above such as a short range communication module, a communication interface supporting wired and/or wireless data communication of the terminal 100, an Internet access module for supporting Internet access to communicate through the Internet network, a digital broadcast module for receiving and playing broadcast signals, etc. Although such components are too various to be enumerated herein due to the trend of convergence of digital devices, other components equivalent to the aforementioned components can be further included in the device. The terminal 100 according to embodiments of the present disclosure can be implemented with or without any of the aforementioned components depending on its implementation. This will be easily understood by those skilled in the art.

According to embodiments of the present disclosure, the terminal 100 can include all types of devices supporting the message function. For example, the terminal 100 can include any of information communication devices, multimedia devices and applied devices thereof such as mobile communication terminals operated by communication protocols corresponding to various communication systems, Portable Multimedia Player (PMP), digital broadcast player, Personal Digital Assistant (PDA), music player (e.g., MP3 player), game console, smartphone, laptop computer, handheld PC, etc.

Although the present disclosure has been described with certain embodiments, various changes and modifications may be suggested to one skilled in the art. It is intended that the present disclosure encompass such changes and modifications as fall within the scope of the appended claims.

What is claimed is:

1. A method for generating a message for transmission, comprising:
   at a terminal having a processor, a storage memory, a user interface, and connected to a network, receiving messages via the network;
   displaying, at a display of the terminal, a plurality of messages related to multiple users identification information, the plurality of messages received by the terminal via the network and stored in the storage memory of the terminal;
   receiving an input event at the user interface;
   determining, by the processor, that the input event is associated with an instruction to generate an aggregated message according to a predetermined rule;
   in response to the instruction to generate an aggregated message from among the plurality of displayed messages according to a predetermined rule, determining, by the processor, an aggregation range for the aggregated message, the aggregated message associated with a message sequence, the aggregation range including messages from the plurality of messages, the messages within the aggregation range displayed as transmitted by at least two different users, each user having specific user identification information displayed adjacent to each message transmitted by each user; and
   wherein determining the aggregation range further comprises receiving a multi-touch input as the input event, the multi-touch input selecting a first displayed message with displayed specific user identification information, the multi-touch input further selecting a last displayed message with the displayed specific user identification information,
   generating an aggregated message ready for transmission via the network by aggregating all of the messages having the same displayed specific user identification information between the first selected displayed message of the multi-touch input and the last selected displayed message of the multi-touch input according to the predetermined rule, the aggregation comprising:
      removing the selected first displayed message and each message of the plurality of displayed messages having the same displayed specific user identification between the first displayed message and the selected last displayed message from the message sequence,
      redisplaying, in a same order, the removed messages with the selected last displayed message, as the aggregated message, the aggregated message being displayed at a position of the selected last displayed message in the message sequence,
      displaying the aggregated message as a bubble with the specific user identification information displayed adjacent to messages received or transmitted from users having different displayed user identification information, the messages received or transmitted from users having different displayed user identification information displayed based on receiving or transmission time information, and
      maintaining a display of all other displayed messages of the message sequence as separately displayed messages with the respective user identification information displayed adjacent to each message.

2. The method of claim 1, wherein aggregating the messages further comprises:
    aggregating only messages corresponding to a specific user identification information selected from the users identification information related to the plurality of messages.

3. The method of claim 1, further comprising:
    receiving, at the user interface, a multi-touch event and configuring the aggregation range according to a predetermined rule associated with the multi-touch event; and
    wherein configuring an aggregation range comprises one or more of:
        configuring current on-screen messages as the aggregation range;
        configuring messages between a specific message selected from the plurality of messages and a most recently received message as the aggregation range;
        configuring messages transmitted on a specific date as the aggregation range; and
        configuring a predetermined number of messages arranged before and after a message selected from the plurality of messages.

4. The method of claim 1, wherein aggregating aggregation range aggregating all of the messages having the same displayed specific user identification information further comprises:
    receiving, via the user interface, a movement touch event, the movement touch event modifying the touch input associated with the instruction to generate an aggregated message, and aggregating the messages within the aggregation range according to the movement touch event; and
    displaying the aggregated message at a position of one of the first and the last message, in a direction of the movement touch event during a multi-touch event, the aggregated message being distinguished from other messages.

5. The method of claim 1, further comprising displaying messages having the same displayed specific user identification information as a message indicated by a multi-touch event to be distinguished from other messages when receiving the multi-touch event for indicating one or more of a first and last message included in the aggregation range.

6. The method of claim 1, wherein receiving the input event comprises:
    receiving a touch event for selecting a first message of the aggregation range, the aggregation range delimited by a first message and a last message;
    receiving a scroll event for searching the last message hidden on a current screen of the display; and
    receiving a touch event for selecting the last message appearing on the current screen according to the scroll event.

7. The method of claim 6, further comprising dividing the current screen into an area including the selected first message and another area where the scroll event is made in search for the last message.

8. The method of claim 1, further comprising:
    displaying the aggregated message at a side of the display;
    receiving a predetermined input signal for disaggregating the aggregated message;
    checking time information on each of the messages stored together when storing the aggregated message and time information on currently displayed other messages; and
    disaggregating and rearranging the aggregated message based on the time information.

9. The method of claim 1, further comprising:
    receiving an input signal for transmitting the aggregated message; and
    transmitting the aggregated message, upon reception of the input signal, via the network, to one or more of a predetermined application program running on a terminal of one or more of multiple users belonging to a message group, a terminal of a specific user designated by the input signal, and a terminal supporting aggregation of the plurality of messages.

10. The method of claim 1, further comprising:
    receiving a predetermined touch event generated at an area of the display where the aggregated message is displayed; and
    deleting a message including a part of content which is designated by the predetermined touch event where the aggregated message is displayed.

11. A terminal for generating a message for transmission, the terminal communicatively connected to a network and comprising:
    a processor;
    a display;
    a user interface; and
    a storage memory capable of storing messages and containing instructions causing the processor to:
        receive messages via the network;
        display, on the display of the terminal, a plurality of messages related to multiple users identification information, the plurality of messages received by the terminal via the network and stored in the storage memory;
        receive an input event, via the user interface,
        determine, by the processor, that the input event is associated with an instruction to generate an aggregated message according to a predetermined rule;
        in response to the instruction to generate an aggregated message from among the plurality of displayed messages according to a predetermined rule, determine, by the processor, an aggregation range for the aggregated message, the aggregated message associated with a message sequence, the aggregation range including messages from the plurality of messages, the messages within the aggregation range displayed as transmitted by at least two different users, each user having specific identification information displayed adjacent to each message transmitted by each user,
            wherein, in determining the aggregation range, the processor receives a multi-touch input as the input event, the multi-touch input selecting a first displayed message with displayed specific user identification information, the multi-touch input further selecting a last displayed message with the displayed specific user identification information, and
        generate an aggregated message ready for transmission via the network by aggregating all of the messages having the same displayed specific user identification information between the first selected displayed message of the multi-touch input and the last selected displayed message of the multi-touch input according to the predetermined rule, the aggregation comprising the processor:
            removing the selected first displayed message and each message of the plurality of displayed messages having the same displayed specific user identification between the first displayed message and the selected last displayed message from the message sequence, redisplaying, in a same order, the removed messages with the selected last displayed message, as the aggregated message, the aggregated message being displayed at a position of the selected last displayed message in the message sequence, displaying the aggregated message as a bubble with the specific user identification information displayed adjacent to messages received or transmitted from users having different displayed user identification information, the messages received or transmitted from users having different displayed user identification information displayed based on receiving or transmission time information, and maintaining a display of all other displayed messages of the message sequence as separately displayed messages with the respective user identification information displayed adjacent to each message.

12. The terminal of claim 11, wherein the storage memory contains instructions causing the processor to:

aggregate only the messages corresponding to a specific user identification information selected from the users identification information related to the plurality of messages.

13. The terminal of claim 11, wherein the aggregation range comprises one of:

an aggregation range designated by first and last messages by the multi-touch input received at the user interface, an aggregation range including current on-screen messages, an aggregation range including messages delimited with a message selected from the plurality of messages and a most recently received message, an aggregation range including the messages transmitted on a specific date, and an aggregation range including a predetermined number of messages arranged before and after a message selected from the plurality of messages.

14. The terminal of claim 11, wherein the storage memory contains instructions causing the processor to receive, via the user interface, a movement touch event modifying a multi-touch event instructing the processor to generate an aggregated message, to aggregate the message in a predetermined range according to the movement touch event, and to display the aggregated message at a position of one of the first message and the last message which are in a direction of the movement touch event during the multi-touch event, to distinguish the aggregated message from other messages.

15. The terminal of claim 11, wherein the display displays messages having the same displayed specific user identification information as a message designated by a multi-touch event when receiving the multi-touch event for designating one or more of a first message and a last message in the aggregation range, to be distinguished from other messages.

16. The terminal of claim 11, wherein the storage memory contains instructions causing the processor to:

receive a touch event, via the user interface, to select a first message of a predetermined range, the predetermined range delimited by a first message and a last message;

receive a scroll event, via the user interface, to search for the last message hidden on a current screen; and receive a touch event, via the user interface, to select the last message appearing on the current screen according to the scroll event.

17. The terminal of claim 16, wherein the display is configured to present a display dividing the current screen into an area having the selected first message and an area where the scroll event is input for search of the last message.

18. The terminal of claim 11, wherein the storage memory contains instructions causing the processor to receive a predetermined input signal, via the user interface, disaggregate the aggregated message displayed at a side of the display, and the storage memory contains instructions causing the processor to check time information on messages stored together when storing the aggregated message and time information on currently displayed other messages, disaggregate the aggregated message, and rearrange the disaggregated messages based on the time information.

19. The terminal of claim 11, wherein the storage memory contains instructions causing the processor to receive an input signal, via the user interface, to transmit the aggregated message, and the terminal transfers the aggregated message, via the network, upon reception of the input signal, to one or more of a predetermined application program running on a terminal of one or more of multiple users belonging to a message group, a terminal of a specific user designated by the input signal, and a terminal supporting aggregation of the plurality of messages.

20. The terminal of claim 11, wherein the storage memory contains instructions causing the processor to receive a predetermined touch event, via the user interface, generated at an area of the display where the aggregated message is displayed, and storage memory contains instructions causing the processor to delete a message including a part of content which is designated by the predetermined touch event from the aggregated message.

21. A method for generating a message for transmission, the method comprising:

at a terminal having a processor, a storage memory, a user interface, and connected to a network, receiving messages via the network;

displaying, at a display of the terminal, a plurality of messages related to multiple users identification information, the plurality of messages received by the terminal via the network and stored in the storage memory;

receiving an input event at the user interface, determining, by the processor, that the input event is associated with an instruction to generate an aggregated message according to a predetermined rule;

determining, by the processor, a delimited aggregation range for the aggregated message, wherein the delimited aggregation range includes messages associated with at least two different users identification information from among the plurality of messages; and generating, by the processor, an aggregated message ready for transmission over the network, the aggregated message aggregating the messages in the delimited aggregation range according to the predetermined rule.

22. A terminal for generating a message for transmission, the terminal communicatively connected to a network and comprising:

a processor;

a display;

a user interface; and a storage memory capable of storing messages and containing instructions causing the processor to:

receive messages via the network, display, on the display of the terminal, a plurality of messages related to multiple users identification information, the plurality of messages received by the terminal via the network and stored in the storage memory, receive an input event, via the user interface, determine that the input event is associated with an instruction to generate an aggregated message according to a predetermined rule, determine an aggregation range for the aggregated message, wherein the aggregation range includes messages associated with at least two different users identification information from among a plurality of messages, receive a second input signal, via the user interface, the second input signal associated with an instruction to delimit the aggregation range of the messages to be aggregated from the plurality of messages, and generate an aggregated message ready for transmission over the network according to the predetermined rule.

23. A method of generating a message for transmission, the method comprising:

at a terminal having a processor, a display, a storage memory, a user interface and connected to a network, receiving messages via the network;

receiving, via the user interface, a multi-touch event designating a first message and a last message among a plurality of messages displayed on the display;

checking, by the processor, user identification information of the messages including a first message and a last message, and the messages displayed between the first and the last message on the display, wherein the checked user information of the messages is associated with at least two different users identification information from among the plurality of messages; and generating an aggregated message ready for transmission via the network according to a predetermined rule, the generating including aggregating the messages per user identification information.

24. The method of claim 1, wherein aggregating the at least some of the messages further comprises:

aggregating the messages corresponding to multiple users identification information related to the messages in the aggregation range to generate a plurality of aggregated messages.

25. The terminal of claim 11, wherein the storage memory contains instructions causing the processor to:

aggregate the messages corresponding to multiple users identification information related to the messages in the aggregation range to generate a plurality of aggregated messages.

* * * * *